US006945551B2

(12) United States Patent
Blake

(10) Patent No.: US 6,945,551 B2
(45) Date of Patent: *Sep. 20, 2005

(54) TRAILER HITCH COVER ASSEMBLY

(75) Inventor: Robert B. Blake, Ferndale, MI (US)

(73) Assignee: Blake Design Group, LLC., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/976,527

(22) Filed: Oct. 12, 2001

(65) Prior Publication Data

US 2002/0125686 A1 Sep. 12, 2002

Related U.S. Application Data

(63) Continuation-in-part of application No. 09/716,666, filed on Nov. 20, 2000, now Pat. No. 6,481,734, which is a continuation-in-part of application No. 09/183,104, filed on Oct. 30, 1998, now Pat. No. 6,176,506, which is a continuation-in-part of application No. 08/795,481, filed on Feb. 11, 1997, now Pat. No. 5,934,699.

(51) Int. Cl.$^7$ ................................................ B60D 1/01
(52) U.S. Cl. ..................................................... 280/507
(58) Field of Search ............................ 280/478.1, 491.1, 280/492.1, 507, 483, 484, 495, 498, 500, 504, 512, 491.5, 416.3; 293/155, 37.6; 220/810, 845, 848; 224/519, 520, 521

(56) References Cited

U.S. PATENT DOCUMENTS

| 2,035,486 A | 3/1936 | Larson |
|---|---|---|
| 2,080,161 A | 5/1937 | Berggren |
| D192,684 S | 5/1962 | Knowles |
| 3,058,757 A | 10/1962 | Sullivan |
| 3,095,058 A | 6/1963 | Woytowich |
| 3,578,358 A | 5/1971 | Reynolds |
| 3,613,044 A | 10/1971 | Rarick |
| 3,716,254 A | 2/1973 | Tarvin |
| 3,746,366 A | 7/1973 | Bruce et al. |
| 4,040,641 A | 8/1977 | Riecke |
| 4,073,508 A | 2/1978 | George et al. |
| 4,138,130 A | 2/1979 | Pickrell et al. |
| 4,141,569 A | 2/1979 | Dilk |
| 4,196,918 A | * 4/1980 | Strader ........................ 267/41 |
| 4,256,324 A | 3/1981 | Hamilton |
| 4,319,764 A | 3/1982 | Whitaker |
| 4,540,194 A | 9/1985 | Dane |
| 4,730,841 A | * 3/1988 | Ponder ........................ 280/501 |
| 4,778,196 A | 10/1988 | Spoliansky |
| 4,784,610 A | 11/1988 | Stuart |
| 4,798,409 A | 1/1989 | Miller |
| 4,893,856 A | 1/1990 | Council |

(Continued)

FOREIGN PATENT DOCUMENTS

| EP | 0 491 241 B1 | 10/1994 |
|---|---|---|
| JP | 1-267191 | 10/1989 |

Primary Examiner—Matthew C. Graham
Assistant Examiner—Mariano Sy
(74) Attorney, Agent, or Firm—Bliss McGlynn, P.C.

(57) ABSTRACT

A trailer hitch cover assembly for a hitch receiver including a main body operatively connected to a hitch tube and adapted to allow insertion of a hitch into the hitch tube. The trailer hitch cover assembly also includes an insulating member disposed between the main body and the hitch tube. The trailer hitch cover assembly further includes a cover plate hingedly connected to the main body and being movable between a closed position and an open position.

20 Claims, 2 Drawing Sheets

U.S. PATENT DOCUMENTS

| | | | |
|---|---|---|---|
| 4,928,993 A | 5/1990 | Appavoo | |
| 4,966,378 A | 10/1990 | Cook | |
| 5,011,176 A | 4/1991 | Eppinette | |
| 5,121,944 A | 6/1992 | Haddox | |
| 5,330,084 A | 7/1994 | Peters | |
| 5,421,601 A | 6/1995 | Hinze et al. | |
| 5,503,423 A | 4/1996 | Roberts et al. | |
| 5,560,631 A | 10/1996 | Salvo | |
| 5,593,170 A | 1/1997 | Chiu | |
| 5,603,178 A | 2/1997 | Morrison | |
| 5,628,536 A | 5/1997 | Fulkerson | |
| 5,722,854 A | 3/1998 | Geisler | |
| 5,800,188 A | 9/1998 | Barber et al. | |
| 5,934,699 A | 8/1999 | Blake | |
| 5,992,871 A | 11/1999 | Rowland et al. | |
| 6,007,033 A | 12/1999 | Casson et al. | |
| 6,019,386 A | 2/2000 | Morelock | |
| 6,053,627 A * | 4/2000 | Vo et al. | 362/485 |
| 6,079,136 A * | 6/2000 | Kozlarek | 52/66 |
| 6,082,753 A | 7/2000 | Kotlier | |
| 6,095,546 A | 8/2000 | Austin | |
| 6,145,865 A | 11/2000 | Cannara et al. | |
| 6,149,181 A | 11/2000 | Biederman | |
| 6,164,680 A | 12/2000 | Kluhsman | |
| 6,176,506 B1 | 1/2001 | Blake | |
| 6,189,910 B1 | 2/2001 | Bartel | |
| 6,199,892 B1 | 3/2001 | Dahl | |
| 6,209,898 B1 * | 4/2001 | Fortier et al. | 280/187 |
| 6,247,257 B1 | 6/2001 | Powell | |
| 6,253,476 B1 | 7/2001 | Powell | |
| 6,260,874 B1 | 7/2001 | Smith et al. | |
| D458,195 S | 6/2002 | Beauvais | |
| 6,409,203 B1 * | 6/2002 | Williams | 224/521 |
| 6,439,595 B1 | 8/2002 | Cheng et al. | |
| 2004/0046361 A1 | 3/2004 | Lewis et al. | |

* cited by examiner

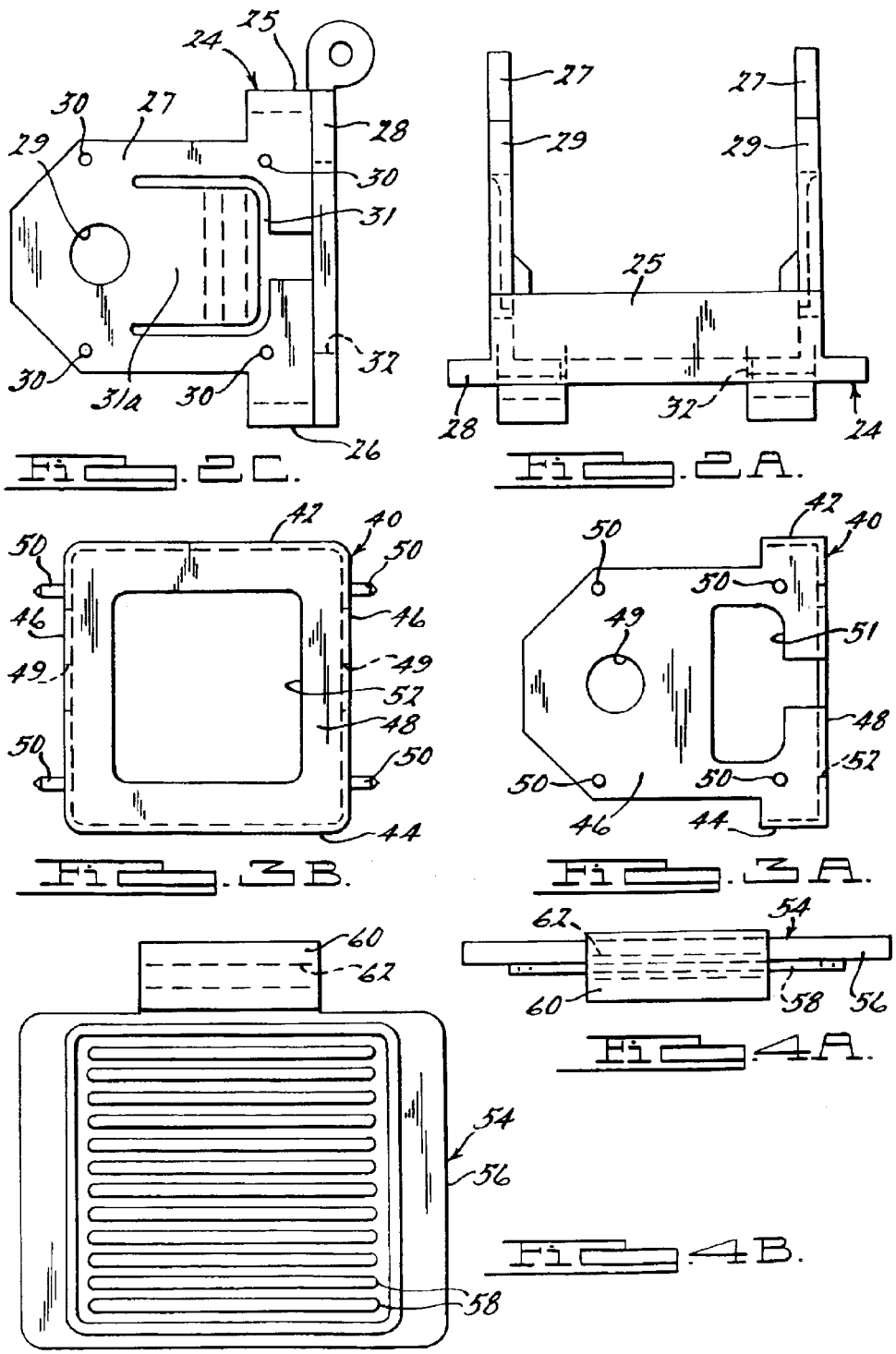

TRAILER HITCH COVER ASSEMBLY

CROSS-REFERENCE TO RELATED APPLICATION(S)

The present application is a continuation-in-part of U.S. Ser. No. 09/716,666, filed Nov. 20, 2000, now U.S. Pat. No. 6,481,734, which is a continuation-in-part of U.S. Ser. No. 09/183,104, filed Oct. 30, 1998, now U.S. Pat. No. 6,176,506, which is a continuation-in-part of U.S. Ser. No. 08/795,481, filed Feb. 11, 1997, now U.S. Pat. No. 5,934,699.

BACKGROUND OF THE INVENTION

1. Field of the Invention

The present invention relates generally to motor vehicles and, more particularly, to a trailer hitch cover assembly for a motor vehicle.

2. Description of the Related Art

It is known that motor vehicles may be provided with a trailer hitch to pull a trailer. Typically, the motor vehicle has a trailer hitch having a hitch tube secured to the motor vehicle beneath the bumper and a ball connector having an insert tube disposed in the hitch tube. A locking pin extends through the tubes to secure the insert tube to the hitch tube. The trailer generally includes a tongue beam, which is releasibly attached to the ball connector as is known in the art.

Of concern in the use of the trailer hitch is the strength and cleanliness of the hitch tube. Typically, the trailer hitch, whether it is a ball or other type of attachment, has the insert tube and ball connector removed from the hitch tube and stored separately. This protects the ball connector and insert tube from corrosion and exposure to the atmosphere but leaves the hitch tube open to the same. The hitch tube, although constructed of painted steel, being constantly exposed to the elements, will typically rust not only externally, but also within the interior of the hitch tube. Additionally, the hitch tube has a tendency to collect mud and dirt from either off-road use or just daily driving. The result is that the hitch tube will have a build up of dirt and rust that will not only impair the insertion of the insert tube but also will ultimately weakens the entire hitch. Accordingly, there is a need in the art to protect the hitch tube by covering the opening of the hitch tube.

There are existing "hitch covers" that are inserted into the end of the hitch tube to offer some protection, but they have certain drawbacks. These types of hitch covers often have more of a decorative purpose than one of protection for the hitch tube and they must be fully removed when the hitch is in use, thereby making them easy to misplace or lose. These types of hitch covers are also of a simple slide-in attachment and are susceptible to falling off or out during motor vehicle use without the driver's knowledge, returning to the original problem of hitch tube exposure to the elements. Quite often these conventional decorative hitch covers have some sort of socially desirable design, such as a sports team emblem or the logo of the vehicle manufacturer, which make them targets of thieves, which again, if stolen, leaves the hitch tube exposed. Therefore, there is a need to provide a trailer hitch cover to overcome the above disadvantages.

SUMMARY OF THE INVENTION

It is, therefore, one object of the present invention to provide a trailer hitch cover assembly for a motor vehicle.

It is another object of the present invention to provide a trailer hitch cover assembly that covers an open end of a hitch tube.

It is yet another object of the present invention to provide a trailer hitch cover assembly that covers an open end of a hitch tube, which remains secured to the hitch tube while still providing access to an interior of the hitch tube.

To achieve the foregoing objects, the present invention is a trailer hitch cover assembly including a main body operatively connected to a hitch tube and adapted to allow insertion of a hitch into the hitch tube. The trailer hitch cover assembly also includes an insulating member disposed between the main body and the hitch tube. The trailer hitch cover assembly further includes a cover plate hingedly connected to the main body and being movable between a closed position and an open position.

One advantage of the present invention is that a trailer hitch cover assembly is provided for a motor vehicle. Another advantage of the present invention is that the trailer hitch cover assembly provides a hinged cover that may be both readily opened for receiving a hitch and may be closed to protect the hitch tube. Yet another advantage of the present invention is that the trailer hitch cover assembly prevents dirt and rust from collecting within the hitch tube when not in use, yet the cover plate may be swung open to provide easy access. Still another advantage of the present invention is that the trailer hitch cover assembly withstands the effects of environmental factors the hitch tube is exposed to such as, sunlight, rain, mud, heat and cold, and vibration and shock. Still yet another advantage of the present invention is that the trailer hitch cover assembly includes a cover plate that does not have to be separated from the motor vehicle, which removes the risk of inadvertent loss. A further advantage of the present invention is that the trailer hitch cover assembly also fits securely and is positively retained on the end of the hitch tube and is not readily removable without tools, thereby, presenting less of a target for theft.

Other objects, features, and advantages of the present invention will be readily appreciated, as the same becomes better understood, after reading the subsequent description when considered in connection with the accompanying drawings.

BRIEF DESCRIPTION OF THE DRAWINGS

FIG. 2A is a plan view of a main body of the trailer hitch cover assembly of FIG. 1B.

FIG. 2C is a side elevational view of the main body of the trailer hitch cover assembly of FIG. 1B.

FIG. 3A is a side elevational view of an insulating member of the trailer hitch cover assembly of FIG. 1B.

FIG. 3B is a front elevational view of the insulating member of the trailer hitch cover assembly of FIG. 1B.

FIG. 4A is a bottom plan view of a cover plate of the trailer hitch cover assembly of FIG. 1B.

FIG. 4B is a rear elevational view of the cover plate of the trailer hitch cover assembly of FIG. 1B.

DESCRIPTION OF THE PREFERRED EMBODIMENT(S)

Figure 1A:
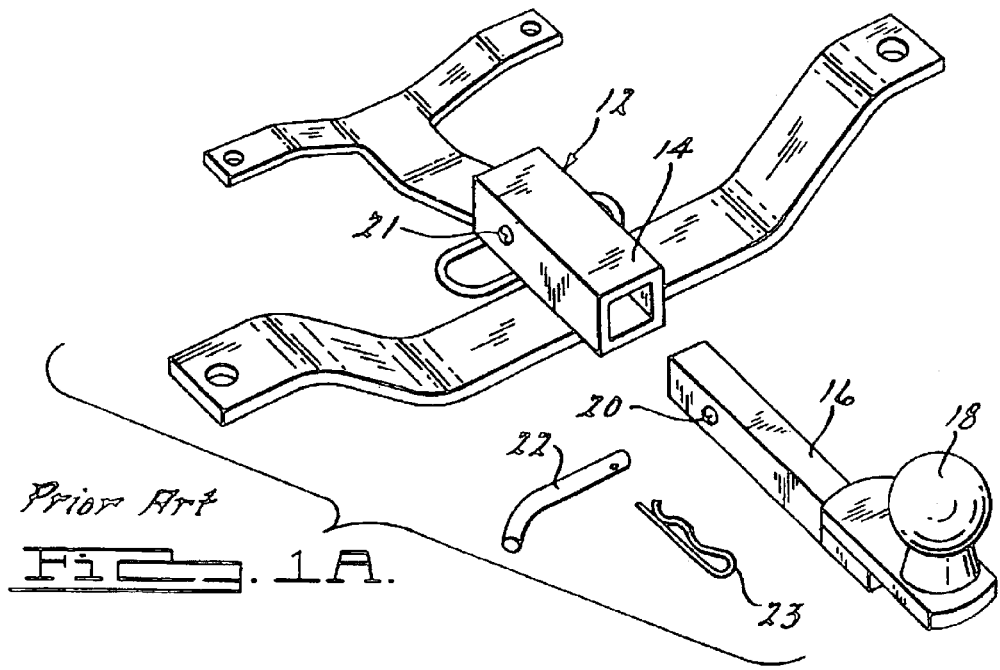
FIG. 1A is a perspective view of a conventional trailer hitch assembly.
Figure 1B:
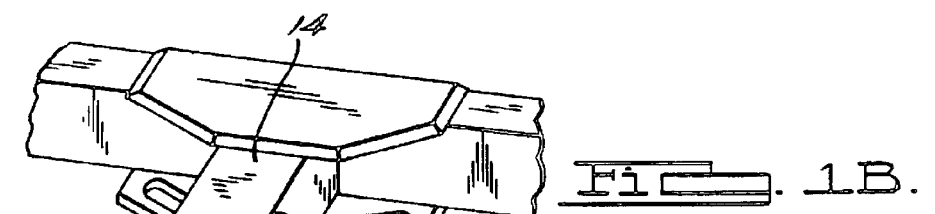
FIG. 1B is a perspective view of a trailer hitch cover assembly, according to the present invention, illustrated in operational relationship with a conventional hitch tube of the trailer hitch assembly.

Referring to the drawings and in particular FIG. 1, one embodiment of a trailer hitch cover assembly 10, according to the present invention, is illustrated in operational relationship with a trailer hitch assembly, generally indicated at 12, for a motor vehicle (not shown). The motor vehicle may be of a pick-up truck type known in the art although any type of motor vehicle may be used in connection with the trailer hitch cover assembly 10. The trailer hitch assembly 12 includes a hitch tube 14 located beneath a rear bumper (not shown) of the motor vehicle. The hitch tube 14 extends longitudinally of the motor vehicle to receive a hitch of an insert tube 16 having a ball connector 18 for the trailer hitch assembly 12. The hitch tube 14 is generally rectangular in shape although any suitable shape may be used. When the insert tube 16 of the ball connector 18 is inserted in the hitch tube 14, it is inserted so that a cross-drilled lockpin aperture 20 on the insert tube 16 aligns with a lockpin aperture 21 extending through the hitch tube 14. A lockpin 22 is then inserted through the lockpin aperture 20 and lockpin aperture 21 and the lockpin 22 is then secured by a hairpin clip 23, which is clipped on the end of the lock pin 22, to prevent the lockpin 22 from exiting the hitch tube 14. The trailer hitch cover assembly 10, according to the present invention, fits over and is retained upon the hitch tube 14 as illustrated in FIG. 1B. It should be appreciated that, except for the trailer hitch cover assembly 10, the trailer hitch assembly 12 is conventional and known in the art.

Figure 2B:
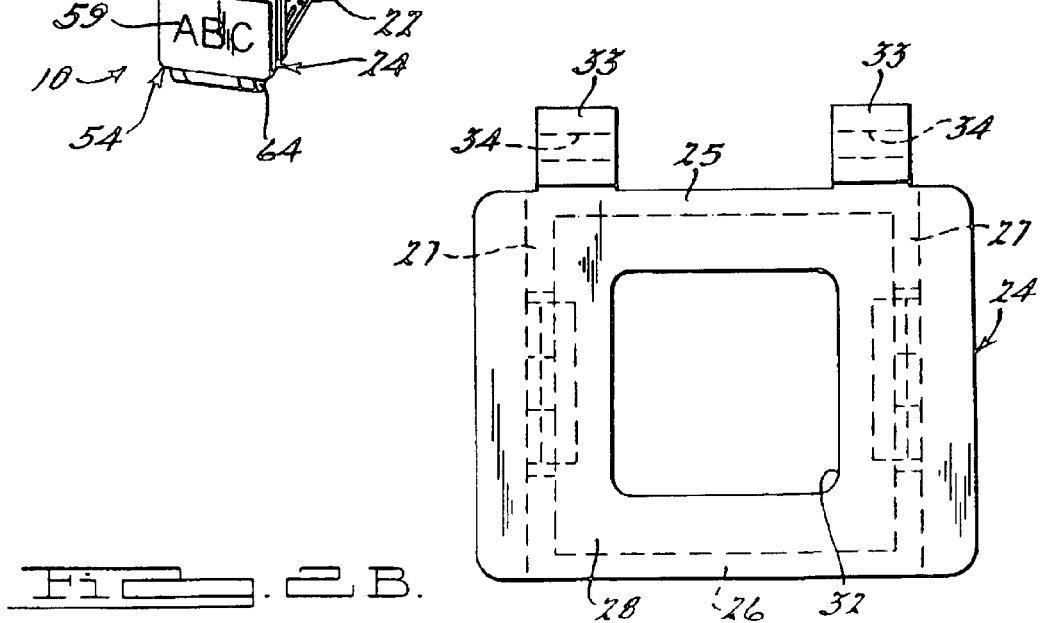
FIG. 2B is a front elevational view of the main body of the trailer hitch cover assembly of FIG. 1B.

Referring to FIGS. 2A through 2C, the trailer hitch cover assembly 10 includes a main body, generally indicated at 24, for connection to the hitch tube 14 of the trailer hitch 12. The main body 24 has a generally rectangular shape defined by a top wall 25, a bottom wall 26, opposed sidewalls 27, and a front wall 28. The side walls 27 include an aperture 29 extending transversely therethrough to receive and allow the mechanically operated lockpin 22 of the trailer hitch assembly 12 to secure the main body 24 to the hitch tube 14 and the insert tube 16 to the hitch tube 14. The sidewalls 27 also include a plurality of apertures 30 extending therethrough for a function to be described. The sidewalls 27 include a slot 31 having a generally inverted "U" shape to form tabs 31a for a function to be described. The front wall 28 is generally rectangular in shape and has an aperture 32 extending longitudinally therethrough to allow the insert tube 16 to be disposed within the hitch tube 14. The aperture 32 is generally rectangular in shape. The front wall 28 also has a pair of transversely spaced flanges or hinge knuckles 33 extending upwardly and forwardly and having an aperture 34 extending therethrough for a function to be described. The main body 24 is made of a rigid material such as metal or plastic. It should be appreciated that the main body 24 fits over the open extended end of the hitch tube 14 as illustrated in FIG. 1B.

Referring to FIGS. 3A and 3B, the trailer hitch cover assembly 10 also includes an insulating member, generally indicated at 40, cooperating with the main body 24. The insulating member 40 is constructed of a thin flexible material, such as a rubberized compound and is cooperatively fitted within the inside of the main body 24 before the main body 24 is attached to the hitch tube 14. The insulating member 40 has a generally rectangular shape defined by a top wall 42, a bottom wall 44, opposed sidewalls 46, and a front wall 48. The side walls 46 include an aperture 49 extending transversely therethrough to receive and allow the mechanically operated lockpin 22 of the trailer hitch 12 to secure the insulating member 40 to the hitch tube 14 and the insert tube 16 to the hitch tube 14. The sidewalls 46 also include a plurality of pins 50 extending outwardly to be received in the apertures 30 of the main body 24 to secure the insulating member 40 to the main body 24. The sidewalls 46 include an opening 51 to allow the tabs 31a to be accessed by a tool (not shown). The front wall 48 is generally rectangular in shape and has an aperture 52 extending longitudinally therethrough to allow the insert tube 16 to be disposed within the hitch tube 14. The aperture 52 is generally rectangular in shape. It should be appreciated that the insulating member 40 is disposed within the main body 24 and the pins 50 are inserted into and pulled through the apertures 30 in the main body 24 to retain and properly orient the insulating member 40 within the main body 24.

Referring to FIGS. 4A and 4B, the trailer hitch cover assembly 10 further includes a rotatable door or cover plate, generally indicated at 54. The cover plate 54 has a plate body 56 that is generally rectangular in shape and of a physical dimension adequate to cover the front wall 28 of the main body 24. The cover plate 54 may include a plurality of raised elements 58 on a rear face of the plate body 56. The cover plate 54 may include indicia 59 on a front face of the plate body 56 as illustrated in FIG. 1B, which is visible to an observer positioned behind the motor vehicle upon which the trailer hitch cover assembly 10 is installed. It should be appreciated that, in other embodiments, the indicia 59 may take any form of graphic or illustrative representation for decorative purposes. It should also be appreciated that, in other embodiments, other methods or types of imprinting a decorative image onto or into the front face of the plate body 56 may be used other than molding.

The cover plate 54 also has a hinge knuckle 60 with a hinge pin bore 62 extending therethrough. The hinge knuckle 60 extends upwardly from the plate body 56 in such a manner that allows the hinge knuckle 60 and the hinge pin bore 62 to correspondingly align with, and cooperatively connect to the flanges 33 and apertures 34 of the main body 24 with the insertion of an appropriate hinge pin 64 therethrough as illustrated in FIG. 1B. The cover plate 54 is rotatable via the hinge pin 64 between a closed position, where a rear face of the plate body 56 is in full contact with a front face of the main body 24, and an open position, where the cover plate 54 is rotated downward away from the main body 24, allowing access to the interior of the hitch tube 14. The cover plate 54 may be urged into the closed position by a spring (not shown) connected to the hinge pin 64. It should also be appreciated that the trailer hitch cover assembly 10 may include a roller (not shown) connected to the hinge pin 64 to eliminate dragging or scraping on pavement due to a steep embankment.

In operation, the trailer hitch cover assembly 10 is installed on the end of the hitch tube 14 by first orienting the side walls 46 of the insulating member 40 with the sidewalls 27 of the main body 24 with the sidewalls of the hitch tube 14. The sidewalls 46 and 27 are slid back over the sides of the hitch tube 14, such that the apertures 29 and 49 align with the lockpin apertures 21 of the hitch tube 14. The trailer hitch cover assembly 10 is retained upon the end of the hitch tube 14 by deflecting the tabs 31a in the sidewalls 27 of the main body 24 laterally to rest behind a flange surrounding the open end of the hitch tube 14. The deflected tabs 31a engage the back or rear surface of the flange of the hitch tube 14. The trailer hitch cover assembly 10 is thereby retained on the end of the hitch tube 14 and will not fall off during usage. It should be appreciated that the trailer hitch cover assembly 10 may be removed with the use of tools to lift the tabs 31a, but it is not so easily removable as to be a ready target for theft.

With the trailer hitch cover assembly 10 installed on the open end of the hitch tube 14, the cover plate 54 will initially be in the closed position, which provides a sealed protective covering for the opening of the hitch tube 14. When the hitch tube 14 is needed for towing, the cover plate 54 may be rotated downward from the front face of the main body 24, thereby exposing the apertures 32 and 52 of the main body 24 and insulating member 40, respectively. The insert tube 16 is inserted through the apertures 32 and 52 and into the open end of the hitch tube 14. The insert tube 16 is secured in the hitch tube 14 by inserting the lockpin 22 through the apertures 29 and 49 of the trailer hitch cover assembly 10 and the apertures 21 of the hitch tube 14 and the apertures 20 of the insert tube 16 as previously described. The lock pin 22 is then secured by the hairpin clip 23. The cover plate 54 may be left to lie against the bottom of the insert tube 16. It should be appreciated that the lockpin 22 may be removed and the insert tube 16 removed and the cover plate 54 rotated to the closed position to protect the hitch tube 14 when not in use.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A trailer hitch cover assembly comprising:
   a main body having an aperture adapted to fit over a trailer hitch tube on a motor vehicle and to allow insertion of a trailer hitch into the hitch tube;
   an insulating member adapted to be disposed over the hitch tube and between said main body and the hitch tube such that said main body overlaps said insulating member; and
   a rotatable cover plate connected to said main body and being movable between a closed position and an open position for closing and opening said aperture.

2. A trailer hitch cover assembly as set forth in claim 1 wherein said main body includes at least one aperture extending therethrough adapted to allow passage of a lock pin.

3. A trailer hitch cover assembly as set forth in claim 1 wherein said main body further comprises a front face having said aperture adapted to allow passage of the hitch into an open end of the hitch tube.

4. A trailer hitch cover assembly as set forth in claim 1 wherein said main body includes at least one first hinge knuckle.

5. A trailer hitch cover assembly as set forth in claim 4 wherein said cover plate includes at least one second hinge knuckle.

6. A trailer hitch cover assembly as set forth in claim 5 including a hinge pin extending through said at least one first hinge knuckle and said at least one second hinge knuckle to allow said cover plate to rotate about said hinge pin between said closed position and said open position.

7. A trailer hitch cover assembly as set forth in claim 1 wherein said main body includes a plurality of apertures extending therethrough.

8. A trailer hitch cover assembly as set forth in claim 1 wherein said cover plate includes a plurality of raised elements.

9. A trailer hitch cover assembly comprising:
   a main body having an open portion adapted to fit over a trailer hitch tube on a motor vehicle and to allow insertion of a trailer hitch into an open end of the hitch tube;
   a cover hingedly connected to said main body and being movable between a closed position and an open position for opening and closing the open end; and
   wherein said main body includes at least one deflectable tab to retain said main body on the hitch tube.

10. A trailer hitch cover assembly comprising:
    a main body operatively connected to a hitch tube and adapted to allow insertion of a hitch into the hitch tube;
    an insulating member disposed between said main body and the hitch tube;
    a cover plate hingedly connected to said main body and being movable between a closed position and an open position;
    wherein said main body includes a plurality of apertures extending therethrough; and
    wherein said insulating member includes a plurality of pins extending outwardly and through said apertures in said main body to connect said insulating member to said main body.

11. A trailer hitch cover assembly comprising:
    a main body having an aperture adapted to fit over a hitch tube and adapted to allow insertion of a hitch into the hitch tube;
    an insulating member adapted to be disposed over the hitch tube and between said main body and the hitch tube such that said main body overlaps said insulating member;
    a rotatable cover plate connected to said main body and being movable between a closed position and an open position for closing and opening said aperture; and
    wherein said insulating member further comprises a front face having an opening adapted to allow passage of the hitch into the open end of the hitch tube.

12. A trailer hitch cover assembly comprising:
    a main body having a front face and an opening adapted to fit over a trailer hitch tube on a motor vehicle to allow passage of a trailer hitch into an open end of the hitch tube;
    an insulating member disposed within and operatively connected to said main body; and
    a movable cover plate connected to said main body to be moved between a first position and a second position for closing and opening the open end of the hitch tube.

13. A trailer hitch cover assembly as set forth in claim 12 wherein said main body includes at least one first hinge knuckle to allow said movable cover plate to be separated from and connected to said main body.

14. A trailer hitch cover assembly as set forth in claim 13 wherein said cover plate includes at least one second hinge knuckle.

15. A trailer hitch cover assembly as set forth in claim 14 including a hinge pin extending through said at least one first hinge knuckle and said at least one second hinge knuckle to allow said cover plate to rotate about said hinge pin between said first position and said second position.

16. A trailer hitch cover assembly comprising:
    a main body having a front face and an opening adapted to fit over a trailer hitch tube on a motor vehicle and to allow passage of a trailer hitch into an open end of the hitch tube;
    an insulating member disposed within and operatively connected to said main body;
    a movable cover hingedly connected to said main body to be moved between a first position and a second position for closing and opening the open end of the hitch tube; and wherein said main body includes opposed side walls extending from said front face with at least one deflectable tab to retain said main body on the hitch tube.

17. A hitch cover assembly comprising:

a main body having a front face and an opening adapted to fit over a hitch tube and to allow passage of a hitch into an open end of the hitch tube;

an insulating member disposed within and operatively connected to said main body;

a movable cover hingedly connected to said main body to be moved between a first position and a second position for closing and opening the open end of the hitch tube;

wherein said main body includes opposed side walls extending from said front face with at least one deflectable tab to retain said main body on the hitch tube; and wherein each of said side walls includes at least one aperture extending therethrough adapted to allow passage of a lock pin.

18. A trailer hitch cover assembly comprising:

a main body for connection to a trailer hitch tube on a motor vehicle and having a front face with an opening adapted to allow passage of a trailer hitch into an open end of the hitch tube and opposed side walls extending from said front face;

a movable cover plate hingedly connected to said main body to be moved between a first position and a second position for closing and opening the open end;

wherein said main body includes a plurality of apertures extending laterally through said sidewalls.

19. A trailer hitch cover assembly comprising:

a main body for connection to a hitch tube and having a front face with an opening adapted to allow passage of a hitch into an open end of the hitch tube and opposed side walls extending from said front face;

an insulating member disposed within and operatively connected to said main body;

a movable cover plate hingedly connected to said main body to be moved between a first position and a second position;

wherein said main body includes a plurality of apertures extending through said sidewalls; and wherein said insulating member includes a plurality of pins extending outwardly and through said apertures to connect said insulating member to said main body.

20. A trailer hitch cover assembly comprising:

a trailer hitch tube for connection to vehicle structure of a motor vehicle and having a first opening adapted to receive a trailer hitch;

a main body having a front face and a second opening to fit over said hitch tube and to allow passage of the hitch into said first opening in said hitch tube;

an insulating member disposed within and operatively connected to said main body; and a movable cover hingedly connected to said main body to be moved between a first position to close said first opening and a second position to open said first opening.

* * * * *